US012068558B2

(12) United States Patent
Hackemeier

(10) Patent No.: US 12,068,558 B2
(45) Date of Patent: Aug. 20, 2024

(54) PLUG CONNECTOR HOUSING FOR TWO CONTACT CARRIERS

(71) Applicant: HARTING ELECTRIC GMBH & CO. KG, Espelkamp (DE)

(72) Inventor: Florian Hackemeier, Espelkamp (DE)

(73) Assignee: HARTING ELECTRIC GMBH & CO. KG (DE)

( * ) Notice: Subject to any disclaimer, the term of this patent is extended or adjusted under 35 U.S.C. 154(b) by 328 days.

(21) Appl. No.: 17/633,492

(22) PCT Filed: Jul. 10, 2020

(86) PCT No.: PCT/DE2020/100605
§ 371 (c)(1),
(2) Date: Feb. 7, 2022

(87) PCT Pub. No.: WO2021/023336
PCT Pub. Date: Feb. 11, 2021

(65) Prior Publication Data

US 2022/0285878 A1 Sep. 8, 2022

(30) Foreign Application Priority Data

Aug. 5, 2019 (DE) .................... 10 2019 104 290.7

(51) Int. Cl.
*H01R 13/518* (2006.01)
*H01R 13/514* (2006.01)

(52) U.S. Cl.
CPC ......... *H01R 13/518* (2013.01); *H01R 13/514* (2013.01)

(58) Field of Classification Search
CPC ... H01R 13/514; H01R 13/516; H01R 13/518
USPC ........................................................ 439/540.1
See application file for complete search history.

(56) References Cited

U.S. PATENT DOCUMENTS

| | | | | |
|---|---|---|---|---|
| 7,553,182 | B2 | 6/2009 | Buck et al. | H01R 13/64 |
| 8,029,312 | B2 | 10/2011 | Sagdic et al. | H01R 13/64 |
| 8,668,530 | B2 | 3/2014 | Riepe et al. | H01R 13/502 |
| 10,069,245 | B2 | 9/2018 | Huhmann et al. | H01R 13/514 |
| 10,686,278 | B2 | 6/2020 | Herbrechtsmeier et al. | H01R 4/01 |
| 11,201,441 | B2 | 12/2021 | Kropiewnicki | H01R 13/514 |

FOREIGN PATENT DOCUMENTS

| | | | |
|---|---|---|---|
| CN | 101467310 | 6/2009 | H01R 13/64 |
| CN | 101901977 | 12/2010 | H01R 13/629 |
| CN | 202797438 | 3/2013 | H01R 13/514 |

(Continued)

OTHER PUBLICATIONS

German Search Report issued in German Patent Appln. No. 20 2019 104 290.7, dated May 27, 2020, with English translation, 8 pages.

(Continued)

*Primary Examiner* — Khiem M Nguyen
(74) *Attorney, Agent, or Firm* — HAYES SOLOWAY P.C.

(57) ABSTRACT

A plug connector housing has receptacles for fastening at least two contact carriers. The plug connector housing has a substantially rectangular cross-section, having two opposite narrow sides and two opposite long sides. The receptacles are integrally formed on the interior within the plug connector housing. In each of the corner regions, a first receptacle is arranged. On each of the long sides, at least one second receptacle is arranged.

16 Claims, 1 Drawing Sheet

(56) References Cited

FOREIGN PATENT DOCUMENTS

Figure 1:
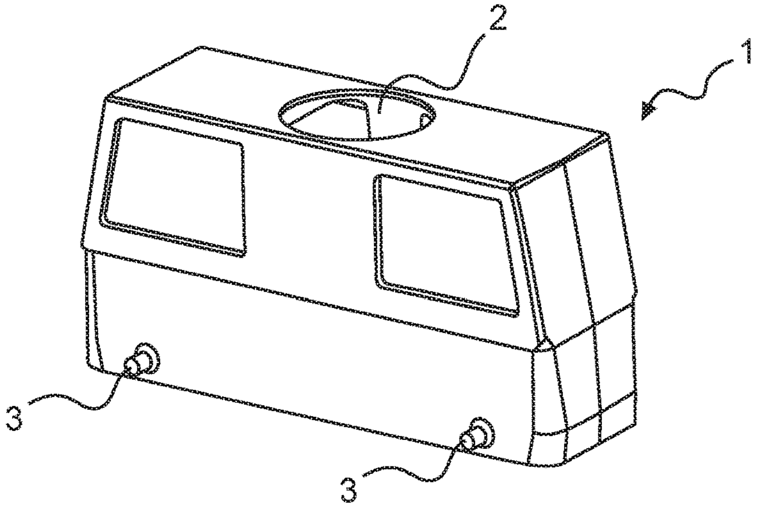

| | | | |
|---|---|---|---|
| CN | 204118419 | 1/2015 | ............. H01R 31/06 |
| CN | 104934741 | 9/2015 | ............. H01R 12/72 |
| CN | 107408774 | 11/2017 | ........... H01R 13/514 |
| CN | 109643865 | 4/2019 | ........... H01R 13/514 |
| CN | 109716594 | 5/2019 | ........... H01R 13/514 |
| DE | 2011 105 009 | 2/2012 | ........... H01R 13/639 |
| DE | 2016 213 286 | 1/2018 | ........... H01R 13/518 |
| EP | 275 053 | 1/2020 | ........... H01R 13/514 |

OTHER PUBLICATIONS

International Search Report and Written Opinion issued in PCT/DE2020/100605, dated Sep. 28, 2020, with English translation, 20 pages.
International Preliminary Report on Patentability issued in PCT/DE2020/100605, dated Feb. 8, 2022, 8 pages.
Chinese Official Action issued in Chinese Patent Appln. No. 202080068510.6, dated Feb. 6, 2024, with English translation, 13 pages.

PLUG CONNECTOR HOUSING FOR TWO CONTACT CARRIERS

The invention relates to a plug connector housing comprising receptacles for fastening at least two contact carriers.

Plug connector housings of this kind are installed for example on device housings and/or switch cabinets. Reference is also made here to so-called flange housings, which are sealed by a flange seal.

PRIOR ART

Document DE 20 2011 105 009 U1 shows a plug connector which can be mounted on a device wall. The plug connector can be plugged together with a mating connector. Plug connectors and mating connectors can be locked with one another via a locking clip. A plug connector of this kind is often also referred to as an industrial plug connector.

DE 102016213286 A1 shows a holding frame for installation in an industrial connector housings. The holding frame comes with modules stocked, with two holding frame halves to fix the modules in pushed together transversely.

CN 202 797 438 U shows a high-frequency connector, 25 consisting of a connection module, a guide module and at least one high frequency module.

Contact carriers are fastened in the plug connector housings of the industrial plug connectors. The contact carriers are used here to receive contact elements, in particular of electrical, pneumatic or optical contacts.

The contact carriers are generally always fitted with identical contact elements. If different contact element types are required, for example solid contact elements for transmitting high currents, and more delicate, filigree contact elements for data transmission, modular industrial plug connectors are thus used, as are known for example from EP 3 275 053 A1. Here, a holding frame is firstly fitted with so-called plug connector modules before this is installed in turn in a plug connector housing. Such a plug connector is often complex to produce.

The German Patent and Trade Mark Office searched the following prior art in the priority application to the present application:

DE 20 2011 105 009 U1, U.S. Pat. No. 8,668,530 B2 and EP 3 275 053 A1.

Problem to be Solved

The object of the invention lies in proposing a plug connector housing which is of a simple structure and at the same time can be used in a versatile manner.

DISCLOSURE OF THE INVENTION

The plug connector housing according to the invention has receptacles for fastening at least two contact carriers. A plug connector equipped in this way can be plugged together with a corresponding mating plug connector.

The plug connector housing has a substantially rectangular cross section. The plug connector housing has two opposite narrow sides and two opposite long sides. Such housing geometries have proven to be effective for industrial plug connectors.

The above-mentioned receptacles are integrally molded on the inside of the plug connector housing. First receptacles are disposed one in each of the corner regions, wherein at least one second receptacle is arranged on each of the long sides. Alternatively, two second receptacles can also be arranged on each of the long sides.

The second receptacle or the second receptacles is/are advantageously arranged approximately centrally on the long sides. Two contact carriers of approximately equal size can thus be installed in the plug connector housing. If the second receptacle or the second receptacles is/are arranged eccentrically on the long sides, two contact carriers of different size can be installable in the plug connector housing.

In a particularly preferred variant of the invention, the second receptacles are mounted within the plug connector housing so as to be displaceable along the long sides. Variable contact carriers of different size can thus be installed in the plug connector housing.

The first receptacle is preferably embodied in each case as a holding plate with a threaded opening disposed therein. The contact carriers each have openings which correspond with the threaded openings in the receptacles. In addition, the contact carriers can be fastened or tightly screwed in the plug connector housing.

The second receptacles are preferably each embodied as a holding plate with a threaded opening disposed therein or as a holding plate with two threaded openings disposed therein. In the first case, two receptacles must then be provided per long side. In the latter case, just one second receptacle per long side is sufficient.

EXEMPLARY EMBODIMENT

Figure 2:
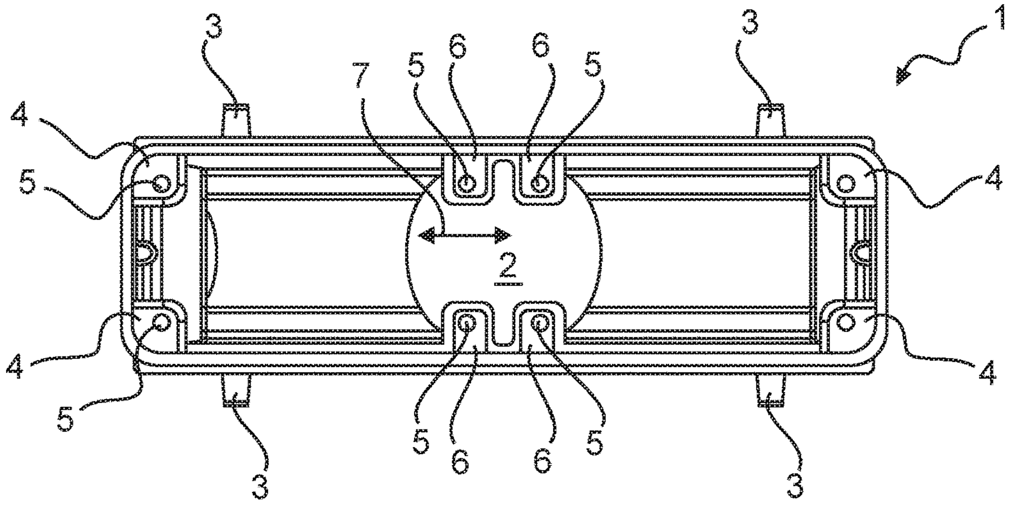
Figure 3:
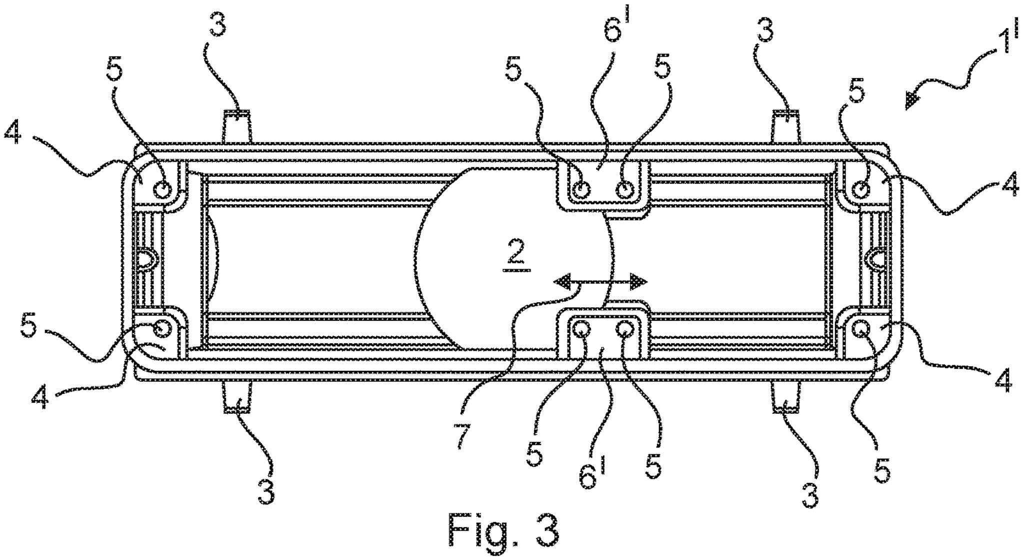

An exemplary embodiment of the invention is shown in the drawings and will be explained in greater detail hereinafter. In the drawings:

FIG. 1 shows a perspective view of a plug connector housing according to the invention, FIG. 2 shows a view into a first embodiment of a plug connector housing according to the invention, and FIG. 3 shows a view into a second embodiment of a plug connector housing according to the invention.

The figures contain partly simplified, schematic depictions. Identical reference signs are sometimes used for the same, but possibly not identical elements. Different views of the same elements might be scaled differently.

FIG. 1 shows a perspective external view of a plug connector housing 1 according to the invention. The plug connector housing 1 has a cable outlet opening 2. Two locking pins 3 are integrally molded on each of the long sides of the plug connector housing 1. A U-shaped locking clip (not shown) can be mounted pivotably on the locking pins 3. Alternatively, the locking pins 3 can serve to act on such a locking clip.

The perspective view in FIG. 2 makes it possible to see inside the plug connector housing 1. The plug connector housing 1 has a rectangular cross section. First receptacles 4 are arranged one in each of the corner regions. The first receptacles 4 are formed as flat holding plates, with threaded openings 5 disposed one in each of said plates. Two second receptacles 6 are provided on each of the long sides and are likewise provided with a threaded opening 5 each. In a particularly preferred embodiment of the invention the second receptacles 6 are shifted along the double-headed arrow 7, whereby a plurality of contact carriers of different size (not shown) can be installed in the plug connector housing 1.

An alternative design of a plug connector housing 1' can be seen in FIG. 3. This design differs in that (merely) one second receptacle 6' is provided on each of the long sides, which receptacles have two threaded openings 5 each. Here too, the receptacles 6' can be shifted (preferably) along the double-headed arrow 7.

Although various aspects or features of the invention are shown in combination in each of the figures, it is evident to a person skilled in the art—unless stated otherwise—that the shown and discussed combinations are not the only ones possible. In particular, corresponding units or feature complexes from different exemplary embodiments can be swapped with one another.

LIST OF REFERENCE SIGNS

1 plug connector housing
2 cable outlet opening
3 locking pin
4 first receptacle
5 threaded opening
6 second receptacle
7 double-headed arrow

The invention claimed is:

1. A plug connector housing which has receptacles for fastening at least two contact carriers, wherein the plug connector housing has a substantially rectangular cross section, with two opposite narrow sides and two opposite long sides, wherein the receptacles are integrally molded on the inside of the plug connector housing, and wherein first receptacles are arranged one in each of the corner regions, and wherein at least one second receptacle is arranged on each of the long sides, wherein the receptacles are integrally molded on the inside of the plug connector housing, and first receptacles are arranged one in each of the corner regions, and in that two second receptacles are arranged on each of the long sides and wherein the second receptacles are mounted so as to be displaceable along the long sides.

2. The plug connector housing as claimed in claim 1, wherein the second receptacle or the second receptacles is/are arranged approximately centrally on the long sides so that two contact carriers or approximately equal size can be installed in the plug connector housing.

3. The plug connector housing as claimed in claim 1, wherein the second receptacle or the second receptacles is/are arranged eccentrically on the long sides so that two contact carriers of different size can be installed in the plug connector housing.

4. The plug connector housing as claimed in claim 1, wherein the first receptacles are each embodied as a holding plate with a threaded opening disposed therein.

5. The plug connector housing as claimed in claim 1, wherein the second receptacles are each embodied as a holding plate with a threaded opening disposed therein or as a holding plate with two threaded openings disposed therein.

6. The plug connector housing as claimed in claim 1, having two contact carriers arranged therein.

7. The plug connector housing as claimed in claim 2, wherein the second receptacles are mounted so as to be displaceable along the long sides.

8. The plug connector housing as claimed in claim 2, wherein the first receptacles are each embodied as a holding plate with a threaded opening disposed therein.

9. The plug connector housing as claimed in claim 2, wherein the second receptacles are each embodied as a holding plate with a threaded opening disposed therein or as a holding plate with two threaded openings disposed therein.

10. The plug connector housing as claimed in claim 3, wherein the second receptacles are mounted so as to be displaceable along the long sides.

11. The plug connector housing as claimed in claim 3, wherein the first receptacles are each embodied as a holding plate with a threaded opening disposed therein.

12. The plug connector housing as claimed in claim 3, wherein the second receptacles are each embodied as a holding plate with a threaded opening disposed therein or as a holding plate with two threaded openings disposed therein.

13. The plug connector housing as claimed in claim 4, wherein the first receptacles are each embodied as a holding plate with a threaded opening disposed therein.

14. The plug connector housing as claimed in claim 4, wherein the second receptacles are each embodied as a holding plate with a threaded opening disposed therein or as a holding plate with two threaded openings disposed therein.

15. The plug connector housing as claimed in claim 5, wherein the first receptacles are each embodied as a holding plate with a threaded opening disposed therein.

16. The plug connector housing as claimed in claim 5, wherein the second receptacles are each embodied as a holding plate with a threaded opening disposed therein or as a holding plate with two threaded openings disposed therein.

* * * * *